US010531347B2

(12) United States Patent
Han et al.

(10) Patent No.: US 10,531,347 B2
(45) Date of Patent: Jan. 7, 2020

(54) POSITIONING METHOD AND APPARATUS FOR DIFFERENT TIME DIVISION DUPLEX UPLINK-DOWNLINK CONFIGURATIONS

(71) Applicant: Huawei Technologies Co., Ltd., Shenzhen (CN)

(72) Inventors: Jing Han, Beijing (CN); Hong Li, Beijing (CN); Jie Cui, Shenzhen (CN); Anjian Li, Beijing (CN); Jiantao Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 262 days.

(21) Appl. No.: 15/614,301

(22) Filed: Jun. 5, 2017

(65) Prior Publication Data

US 2017/0272987 A1  Sep. 21, 2017

Related U.S. Application Data

(63) Continuation of application No. PCT/CN2014/093147, filed on Dec. 5, 2014.

(51) Int. Cl.
*H04W 36/00* (2009.01)
*H04W 64/00* (2009.01)
(Continued)

(52) U.S. Cl.
CPC ....... *H04W 36/0083* (2013.01); *H04L 5/0035* (2013.01); *H04L 5/0096* (2013.01);
(Continued)

(58) Field of Classification Search
CPC ......... H04W 36/0083; H04W 36/0016; H04W 64/00; H04L 5/0035; H04L 5/0096; H04L 5/001; H04L 5/0092; H04L 5/1469
(Continued)

(56) References Cited

U.S. PATENT DOCUMENTS

2013/0078913 A1*  3/2013  Lee .................. H04L 5/0007
                                                              455/39
2013/0194931 A1*  8/2013  Lee .................. H04L 5/0053
                                                              370/241
(Continued)

FOREIGN PATENT DOCUMENTS

CN        104205668 A    12/2014
EP         2606697 A1     6/2013
(Continued)

OTHER PUBLICATIONS

"3rd Generation Partnership Project; Technical Specification Group Radio Access Network; Evolved Universal Terrestrial Radio Access (E-UTRA); Requirements for support of radio resource management (Release 12)," ,3GPP TS 36.133 V12.5.0, pp. 1-877, 3rd Generation Partnership Project, Valbonne, France (Sep. 2014).

(Continued)

Primary Examiner — Mong-Thuy T Tran
(74) Attorney, Agent, or Firm — Leydig, Voit & Mayer, Ltd.

(57) ABSTRACT

The present invention discloses a positioning method. When a primary cell PCell and a serving cell SCell that are of user equipment UE have different uplink-downlink configurations at a same subframe location, and the UE does not support simultaneous transmission and reception, the method includes: receiving, by a first device, positioning information of the UE, where the positioning information includes positioning assistance information, or positioning assistance information and a UE identifier, and the positioning assistance information includes at least positioning reference signal PRS information, or PRS information and a Cell ID; determining, by the first device and according to the positioning information, that the UE performs PRS measurement at the same subframe location of the SCell that has same configuration, and avoiding, by the first device, sched- (Continued)

uling data or configuring a sounding signal sounding at the same subframe location of the PCell and the SCell that have different configurations.

12 Claims, 14 Drawing Sheets

(51) Int. Cl.
*H04L 5/00* (2006.01)
*H04L 5/14* (2006.01)
(52) U.S. Cl.
CPC ....... *H04W 36/0016* (2013.01); *H04W 64/00* (2013.01); *H04L 5/001* (2013.01); *H04L 5/0092* (2013.01); *H04L 5/1469* (2013.01)
(58) Field of Classification Search
USPC ..................................................... 455/422.1
See application file for complete search history.

(56) References Cited

U.S. PATENT DOCUMENTS

| | | | |
|---|---|---|---|
| 2014/0112261 A1 | 4/2014 | Chen et al. | |
| 2014/0133369 A1 | 5/2014 | Cheng et al. | |
| 2014/0349582 A1 | 11/2014 | Xiao et al. | |
| 2015/0049653 A1 | 2/2015 | Baghel et al. | |
| 2015/0181492 A1* | 6/2015 | Schmidt | H04W 36/30 455/443 |
| 2016/0105831 A1* | 4/2016 | Masini | H04W 36/0055 455/436 |
| 2016/0254892 A1* | 9/2016 | Kim | H04W 52/34 370/280 |
| 2017/0064541 A1* | 3/2017 | Uchino | H04L 5/1469 |

FOREIGN PATENT DOCUMENTS

| | | |
|---|---|---|
| EP | 3119027 A1 | 1/2017 |
| WO | 2012175030 A1 | 12/2012 |
| WO | 2013172769 A1 | 11/2013 |
| WO | 2014019125 A1 | 2/2014 |
| WO | 2014025302 A1 | 2/2014 |

OTHER PUBLICATIONS

"3rd Generation Partnership Project; Technical Specification Group Radio Access Network; Evolved Universal Terrestrial Radio Access (E-UTRA); Physical channels and modulation (Release 12)," 3GPP TS 36.211 V12.3.0, pp. 1-124, 3rd Generation Partnership Project, Valbonne, France (Sep. 2014).
"3rd Generation Partnership Project; Technical Specification Group Radio Access Network; Evolved Universal Terrestrial Radio Access (E-UTRA); Radio Resource Control (RRC); Protocol Specification (Release 12)," 3GPP TS 36.331 V12.3.0, pp. 1-378, 3rd Generation Partnership Project, Valbonne, France (Sep. 2014).
"3rd Generation Partnership Project; Technical Specification Group Radio Access Network; Evolved Universal Terrestrial Radio Access (E-UTRA); LTE Positioning Protocol (LPP) (Release 12)," 3GPP TS 36355 V12.2.0, pp. 1-126, 3rd Generation Partnership Project, Valbonne, France (Jun. 2014).
"3rd Generation Partnership Project; Technical Specification Group Radio Access Network; Evolved Universal Terrestrial Radio Access (E-UTRA); LTE Positioning Protocol A (LPPa) (Release 12)," 3GPP TS 36.455 V12.0.0, pp. 1-62, 3rd Generation Partnership Project, Valbonne, France (Jun. 2014).

* cited by examiner

| | SF #0 | SF #1 | SF #2 | SF #3 | SF #4 | SF #5 | SF #6 | SF #7 | SF #8 | SF #9 |
|---|---|---|---|---|---|---|---|---|---|---|
| PCell Config #0 | D | S | U | U | U | D | S | U | U | U |
| SCell Config #1 | D | S | U | U | D | D | S | U | U | D |

Different TDD uplink-downlink configurations in inter-band carrier aggregation

FIG. 1

|  | SF #0 | SF #1 | SF #2 | SF #3 | SF #4 | SF #5 | SF #6 | SF #7 | SF #8 | SF #9 |
|---|---|---|---|---|---|---|---|---|---|---|
| PCell TDD Config #0 | D | S | U | U | U | D | S | U | U | U |
| SCell TDD Config #1 | D | S | U | D | D | D | S | U | U | D |

FIG. 5

POSITIONING METHOD AND APPARATUS FOR DIFFERENT TIME DIVISION DUPLEX UPLINK-DOWNLINK CONFIGURATIONS

CROSS-REFERENCE TO RELATED APPLICATIONS

This application is a continuation of International Application No. PCT/CN2014/093147, filed on Dec. 5, 2014, the disclosure of which is hereby incorporated by reference in its entirety.

TECHNICAL FIELD

The present invention relates to the field of mobile communications, and in particular, to a positioning method and apparatus for different TDD uplink-downlink configurations in the field of mobile communications.

BACKGROUND

With continuous development of mobile communications technologies, a requirement for a positioning service is also increasing, and application scenarios of the positioning service are increasingly diverse, such as emergency assistance positioning, crime location tracing, navigation, and traffic control. However, regardless of how diverse the application scenarios are, a requirement of an industry for positioning is always to obtain a reliable, effective, and quick method; that is, a positioning technology that is easy to implement and highly accurate is always a user's most important requirement.

In observed time difference of arrival (OTDOA) positioning, a mobile station is used to receive a downlink positioning reference signal from multiple base stations and perform timing measurement, report time difference of arrival of PRSs between base stations, and perform calculation on a network positioning server to obtain a geographical location of the mobile station. A principle of the OTDOA positioning is as follows: User equipment (UE) detects and measures the positioning reference signals (PRS) to obtain a reference signal time difference (RSTD). Generally, a positioning server is used to configure the UE to complete the OTDOA positioning on a secondary cell (SCell).

In inter-band carrier aggregation (CA), a PCell and an SCell have different time division duplex (TDD) uplink-downlink configurations. As shown in FIG. 1, when a TDD configuration of the SCell is 1, each PRS opportunity on the SCell includes $N_{PRS}=4$ PRS subframes, which are respectively subframes #1, #4, #5, and #9, and an interval at which the PRS opportunity occurs is 160 ms (that is, $T_{PRS}=160_{MS}$). However, when a TDD configuration of the primary cell (PCell) is 0, an SF #4 and an SF #9 are uplink subframes. Because the UE does not support simultaneous transmission and reception, the UE cannot receive a PRS signal on the SF #4 or the SF #9, thereby affecting accuracy of OTDOA measurement.

Therefore, during implementation of a CA scenario, positioning inaccuracy caused when different TDD uplink-downlink configurations are performed is an urgent problem that needs to be resolved.

SUMMARY

In view of this, embodiments of the present invention provide a positioning method and apparatus for different TDD uplink-downlink configurations, so as to improve positioning accuracy when different TDD uplink-downlink configurations are performed in a CA scenario.

According to a first aspect, a positioning method for different TDD uplink-downlink configurations is provided, where when a primary cell PCell and a serving cell SCell that are of user equipment UE have different uplink-downlink configurations at a same subframe location, and the UE does not support simultaneous transmission and reception, the method includes:

receiving, by a first device, positioning information of the UE, where the positioning information includes positioning assistance information, or positioning assistance information and a UE identifier, and the positioning assistance information includes at least positioning reference signal PRS information, or PRS information and a Cell ID; and determining, by the first device and according to the positioning information, that the UE performs PRS measurement at the same subframe location of the SCell that has same configuration, and avoiding, by the first device, scheduling data or configuring a sounding signal sounding at the same subframe location of the PCell and the SCell that have different configurations.

With reference to the first aspect, in a first possible implementation manner of the first aspect, when the first device is a serving base station, the receiving positioning information includes: receiving the positioning assistance information sent by the UE; or receiving the positioning assistance information and the UE identifier that are sent by a positioning server.

With reference to the first aspect, in a second possible implementation manner of the first aspect, when the first device is a target base station, the receiving positioning information of the UE includes:

after the UE hands over from a source base station to the target base station, receiving the positioning assistance information sent by the UE; or after the UE hands over from a source base station to the target base station, receiving the UE identifier and the positioning assistance information of the UE that are sent by the positioning server, where the UE identifier is sent by the UE to the positioning server; or after the UE hands over from a source base station to the target base station, receiving the UE identifier and the positioning assistance information of the UE that are sent by the positioning server, where the UE identifier is sent by the source base station to the positioning server; or after the UE hands over from a source base station to the target base station, receiving the UE identifier and the positioning assistance information of the UE that are sent by the source base station, where the UE identifier is sent by the source base station to the target base station.

With reference to any one of the first aspect, or the first to the second possible implementation manners of the first aspect, in a third possible implementation manner of the first aspect, the avoiding, by the first device, scheduling data or configuring a sounding signal sounding at the same subframe location of the PCell and the SCell that have different configurations includes:

if a subframe at the same subframe location of the PCell is a downlink subframe, skipping, by the first device, scheduling the downlink subframe, so that the UE sends a signal and a channel on a subframe that is of the SCell and that is at the same subframe location of the PCell; or if a subframe at the same subframe location of the PCell is an uplink subframe, skipping, by the first device, scheduling the uplink subframe or configuring a sounding signal, so that the UE receives downlink transmission on a subframe that is of the SCell and that is at the same subframe location of the PCell; or if a subframe at the same subframe location of the PCell is a special subframe, skipping, by the first device, scheduling the special subframe, so that the UE receives a downlink signal in an OFDM symbol that is of the SCell and that overlaps a guard period or an UpPTS in the special subframe of the PCell.

According to a second aspect, a positioning method for different TDD uplink-downlink configurations is provided, where when a primary cell PCell and a secondary cell SCell that are of user equipment UE have different uplink-downlink configurations at a same subframe location, and the UE does not support simultaneous transmission and reception, the method includes: receiving, by the UE, a positioning measurement request sent by a positioning server; receiving, by the UE, positioning assistance information sent by the positioning server, where the positioning assistance information includes at least positioning reference signal PRS information; and measuring, by the UE and according to the positioning assistance information, $N_{PRS}$ consecutive subframes including a PRS on the SCell, where the $N_{PRS}$ PRS subframes do not include a downlink subframe that is of the SCell and that is at the same subframe location as an uplink subframe or a special subframe of the PCell.

With reference to the second aspect, in a first possible implementation manner of the second aspect, the method further includes:

after the UE hands over from a source base station to a target base station, receiving, by the positioning server, a serving Cell ID entifier that is sent by the UE and that is obtained after the UE is handed over; or after the UE hands over from a source base station to a target base station, receiving, by the positioning server, a serving Cell ID entifier that is sent by the source base station and that is obtained after the UE is handed over.

With reference to the second aspect, in a second possible implementation manner of the second aspect, the method further includes receiving, by the positioning server, UE status feedback information sent by the UE.

According to a third aspect, a positioning method for different TDD uplink-downlink configurations is provided, where when a PCell and an SCell that are of user equipment UE have different uplink-downlink configurations at a same subframe location, and the UE does not support simultaneous transmission and reception, the method includes: receiving, by the UE, a positioning measurement request; handing over, by the UE, from a source base station to a target base station; and sending, by the UE, positioning assistance information of the UE to the target base station, where the positioning assistance information includes at least positioning reference signal PRS information, or PRS information and a Cell ID, so that the target base station determines, according to the positioning information, that the UE performs PRS measurement at the same subframe location of the SCell that has same configuration, and avoids scheduling data or configuring a sounding signal sounding at the same subframe location of the PCell and the SCell that have different configurations.

With reference to the third aspect, in a first possible implementation manner of the third aspect, the method further includes: if a subframe at the same subframe location of the PCell is an uplink subframe, and the UE does not send any data on the uplink subframe, receiving, by the UE, a downlink signal on a subframe that is of the SCell and that is at the same subframe location of the PCell; or if a subframe at the same subframe location of the PCell is an uplink subframe, and the UE needs to measure a PRS signal on a subframe that is of the SCell and that is at the same subframe location of the PCell, skipping, by the UE, sending any data on the uplink subframe.

According to a fourth aspect, a positioning apparatus for different TDD uplink-downlink configurations is provided, including:

a processing module, configured to determine that a primary cell PCell and a secondary cell SCell that are of user equipment UE have different uplink-downlink configurations at a same subframe location, and the UE does not support simultaneous transmission and reception; and a receiving module, configured to receive positioning information of the UE according to a result determined by the processing module, where the positioning information includes positioning assistance information, or positioning assistance information and a UE identifier, and the positioning assistance information includes at least positioning reference signal PRS information, or PRS information and a Cell ID; where the processing module is configured to determine, according to the positioning information received by the receiving module, that the UE performs PRS measurement at the same subframe location of the SCell that has same configuration, and avoid scheduling data or configuring a sounding signal sounding at the same subframe location of the PCell and the SCell that have different configurations.

With reference to the fourth aspect, in a first possible implementation manner of the fourth aspect, when the apparatus is a serving base station, the receiving module is specifically configured to:

receive the positioning assistance information sent by the UE; or receive the positioning assistance information and the UE identifier that are sent by a positioning server.

With reference to the fourth aspect, in a second possible implementation manner of the fourth aspect, when the apparatus is a target base station, the receiving module is specifically configured to:

after the UE hands over from a source base station to the target base station, receive the positioning assistance information sent by the UE; or after the UE hands over from a source base station to the target base station, receive the UE identifier and the positioning assistance information of the UE that are sent by the positioning server, where the UE identifier is sent by the UE to the positioning server; or after the UE hands over from a source base station to the target base station, receive the UE identifier and the positioning assistance information of the UE that are sent by the positioning server, where the UE identifier is sent by the source base station to the positioning server; or after the UE hands over from a source base station to the target base station, receive the UE identifier and the positioning assistance information of the UE that are sent by the source base station, where the UE identifier is sent by the source base station to the target base station.

With reference to any one of the fourth aspect, or the first to the second possible implementation manners of the fourth aspect, in a third possible implementation manner of the fourth aspect, the processing module is specifically configured to:

if a subframe at the same subframe location of the PCell is a downlink subframe, skip scheduling the downlink subframe, so that the UE sends a signal and a channel on a subframe that is of the SCell and that is at the same subframe location of the PCell; or if a subframe at the same subframe location of the PCell is an uplink subframe, skip scheduling the uplink subframe or configuring a sounding signal, so that the UE receives downlink transmission on a subframe that is of the SCell and that is at the same subframe location of the PCell; or if a subframe at the same subframe location of the PCell is a special subframe, skip scheduling the special subframe, so that the UE receives a downlink signal in an OFDM symbol that is of the SCell and that overlaps a guard period or an UpPTS in the special subframe of the PCell.

According to a fifth aspect, a positioning apparatus for different TDD uplink-downlink configurations is provided, including:

a processing module, configured to determine that a primary cell PCell and a secondary cell SCell that are of user equipment UE have different uplink-downlink configurations at a same subframe location, and the UE does not support simultaneous transmission and reception; and a receiving module, configured to receive, according to a result determined by the processing module, a positioning measurement request sent by a positioning server; where: the receiving module is configured to receive positioning assistance information sent by the positioning server, where the positioning assistance information includes at least positioning reference signal PRS information; and the processing module is configured to measure, according to the positioning assistance information received by the receiving module, $N_{PRS}$ consecutive subframes including a PRS on the SCell, where the $N_{PRS}$ PRS subframes do not include a downlink subframe that is of the SCell and that is at the same subframe location as an uplink subframe or a special subframe of the PCell.

According to a sixth aspect, a positioning apparatus for different TDD uplink-downlink configurations is provided, including:

a processing module, configured to determine that a primary cell PCell and a secondary cell SCell that are of user equipment UE have different uplink-downlink configurations at a same subframe location, and the UE does not support simultaneous transmission and reception; and a sending module, configured to send a positioning measurement request to the user equipment UE according to a result determined by the processing module; where: the sending module is configured to send the positioning information including positioning assistance information and the UE identifier to a first device, where the positioning assistance information includes at least positioning reference signal PRS information, or PRS information and a Cell ID, so that the first device determines, according to the positioning information, that the UE performs PRS measurement at the same subframe location of the SCell that has same configuration, and avoids scheduling data or configuring a sounding signal sounding at the same subframe location of the PCell and the SCell that have different configurations.

With reference to the sixth aspect, in a first possible implementation manner of the sixth aspect, the apparatus further includes:

a receiving module, configured to: after the UE hands over from a source base station to a target base station, receive a serving Cell ID entifier that is sent by the UE and that is obtained after the UE is handed over; or after the UE hands over from a source base station to a target base station, receive a serving Cell ID entifier that is sent by the source base station and that is obtained after the UE is handed over.

With reference to the sixth aspect, in a second possible implementation manner of the sixth aspect, the receiving module is further configured to receive UE status feedback information sent by the UE.

According to a seventh aspect, a positioning apparatus for different TDD uplink-downlink configurations is provided, including:

a processing module, configured to determine that a primary cell PCell and a secondary cell SCell that are of user equipment UE have different uplink-downlink configurations at a same subframe location, and the UE does not support simultaneous transmission and reception;

a receiving module, configured to receive a positioning measurement request according to a result determined by the processing module; where the processing module is configured to hand over from a source base station to a target base station; and a sending module, configured to send positioning assistance information of the target base station to the target base station, where the positioning assistance information includes at least positioning reference signal PRS information, or PRS information and a Cell ID, so that the target base station determines, according to the positioning information, that the UE performs PRS measurement at the same subframe location of the SCell that has same configuration, and avoids scheduling data or configuring a sounding signal sounding at the same subframe location of the PCell and the SCell that have different configurations.

With reference to the seventh aspect, in a first possible implementation manner of the seventh aspect, the processing module is further configured to: if a subframe at the same subframe location of the PCell is an uplink subframe, and the UE does not send any data on the uplink subframe, receive a downlink signal on a subframe that is of the SCell and that is at the same subframe location of the PCell; or if a subframe at the same subframe location of the PCell is an uplink subframe, and the UE needs to measure a PRS signal on a subframe that is of the SCell and that is at the same subframe location of the PCell, skip sending any data on the uplink subframe.

Based on the foregoing technical solutions, according to the positioning method and apparatus for different TDD uplink-downlink configurations in the embodiments of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic diagram of different TDD uplink-downlink configurations in inter-band carrier aggregation in the prior art;

FIG. 5 shows another schematic diagram of a frame structure of different TDD uplink-downlink configurations according to an embodiment of the present invention;

DESCRIPTION OF EMBODIMENTS

Figure 2:
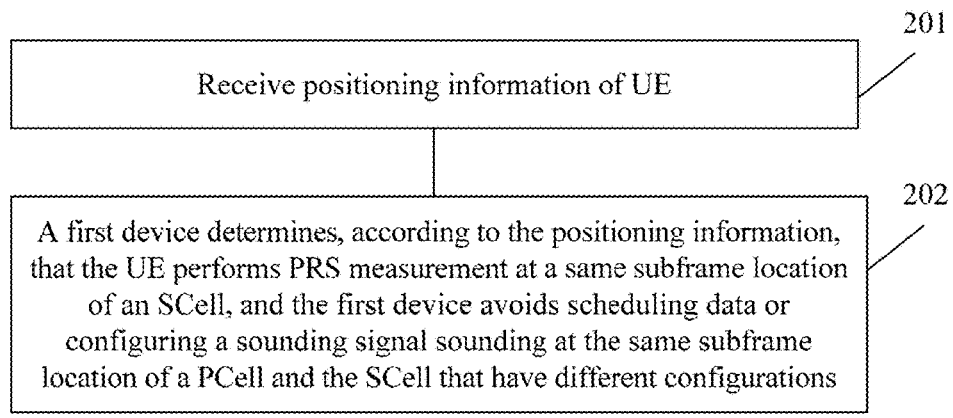
FIG. 2 shows a schematic flowchart of a positioning method for different TDD uplink-downlink configurations according to an embodiment of the present invention.

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

A positioning technology is a technology used to determine a geographical location of a mobile station, and location information of the mobile station may be directly or indirectly obtained by using a resource of a wireless communications network. Currently, an OTDOA is one of relatively common standard terminal positioning manners used in Long Term Evolution (LTE). Generally, based on a positioning algorithm of the mobile station in the LTE, a feature parameter (such as signal field strength, propagation signal time difference of arrival, and signal orientation angle of arrival) of a radio wave propagation signal between the mobile station and a base station may be detected, and then a geometric location of the mobile station may be estimated according to a related positioning algorithm. In OTDOA positioning, the mobile station is used to receive a downlink positioning reference signal from multiple base stations and perform timing measurement, report time difference of arrival of PRSs between base stations, and perform calculation on a network positioning server to obtain the geographical location of the mobile station.

For a positioning accuracy requirement, the US Federal Communications Commission (FCC) published the E-911 regulation in 1996, which requires that, before Oct. 1, 2001, wireless cellular systems of US telecommunications operators must provide a positioning service with an accuracy within 125 m for a mobile station that initiates an E-911 emergency call, and a probability of meeting the positioning accuracy must not be lower than 67%. In 1998, the FCC proposed a service requirement that the positioning accuracy is within 400 m and an accuracy rate is not lower than 90%. In 1999, the FCC proposed a new positioning accuracy requirement: For positioning based on a network, 67% of the positioning accuracy needs to be within 100 m, and 95% of the positioning accuracy needs to be within 300 m; and for positioning based on a mobile station, 67% of the accuracy needs to be within 50 m, and 95% of the accuracy needs to be within 150 m.

When a PRS bandwidth is greater than 50 RBs, a subframe including a PRS (that is, $N_{PRS}=1$ PRS subframe) may be configured by using a network. That is, when a system bandwidth is high enough, a PRS location opportunity includes only one PRS subframe. As shown in FIG. 1, on a subframe #4, an interval at which a PRS opportunity occurs is 160 ms (that is, $T_{PRS}=160_{MS}$). In addition, when a TDD configuration of a PCell is 0, and the SF #4 is an uplink subframe, UE cannot receive the signal on the SF #4 of an SCell. Because the PRS signal is periodically sent, the UE can never receive the PRS, and the UE cannot perform OTDOA RSTD measurement.

Therefore, in a CA scenario, because different TDD uplink-downlink configurations are performed, the OTDOA RSTD measurement cannot be performed, and this is an urgent problem that needs to be resolved.

To resolve the foregoing technical problem, the present invention provides the following technical solutions.

It should be specially noted that, in an embodiment of the present invention, a positioning server may be an enhanced serving mobile location center (E-SMLC), or may be a base station or a mobility management entity; or a positioning server may be used as a module in a base station, or may be a mobile control module independent of a base station.

FIG. 2 shows a positioning method for different TDD uplink-downlink configurations according to an embodiment of the present invention. When a primary cell PCell and a serving cell SCell that are of user equipment UE have different uplink-downlink configurations at a same subframe location, and the UE does not support simultaneous transmission and reception, the method includes:

201. A first device receives positioning information of the UE, where the positioning information includes positioning assistance information, or positioning assistance information and a UE identifier, and the positioning assistance information includes at least positioning reference signal PRS information, or PRS information and a Cell ID.

202. The first device determines, according to the positioning information, that the UE performs PRS measurement at the same subframe location of the SCell, and the first device avoids scheduling data or configuring a sounding signal sounding at the same subframe location of the PCell and the SCell that have different configurations, so that the UE performs the PRS positioning measurement.

When the first device is a serving base station, the receiving positioning information includes: receiving the positioning assistance information sent by the UE; or receiving the positioning assistance information and the UE identifier that are sent by a positioning server.

When the first device is a target base station, the receiving positioning information of the UE includes:

after the UE hands over from a source base station to the target base station, receiving the positioning assistance information sent by the UE; or after the UE hands over from a source base station to the target base station, receiving the UE identifier and the positioning assistance information of the UE that are sent by the positioning server, where the UE identifier is sent by the UE to the positioning server; or after the UE hands over from a source base station to the target base station, receiving the UE identifier and the positioning assistance information of the UE that are sent by the positioning server, where the UE identifier is sent by the source base station to the positioning server; or after the UE hands over from a source base station to the target base station, receiving the UE identifier and the positioning assistance information of the UE that are sent by the source base station, where the UE identifier is sent by the source base station to the target base station.

The avoiding, by the first device, scheduling data or configuring a sounding signal sounding at the same subframe location of the PCell and the SCell that have different configurations, so that the UE performs the PRS measurement includes:

If a subframe at the same subframe location of the PCell is a downlink subframe, the first device does not schedule the downlink subframe, so that the UE sends a signal and a channel on a subframe that is of the SCell and that is at the same subframe location of the PCell; or if a subframe at the same subframe location of the PCell is an uplink subframe, the first device does not schedule the uplink subframe or configure a sounding signal, so that the UE receives downlink transmission on a subframe that is of the SCell and that is at the same subframe location of the PCell; or if a subframe at the same subframe location of the PCell is a special subframe, the first device does not schedule the special subframe, so that the UE receives a downlink signal in an OFDM symbol that is of the SCell and that overlaps a guard period or an UpPTS in the special subframe of the PCell.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 3:
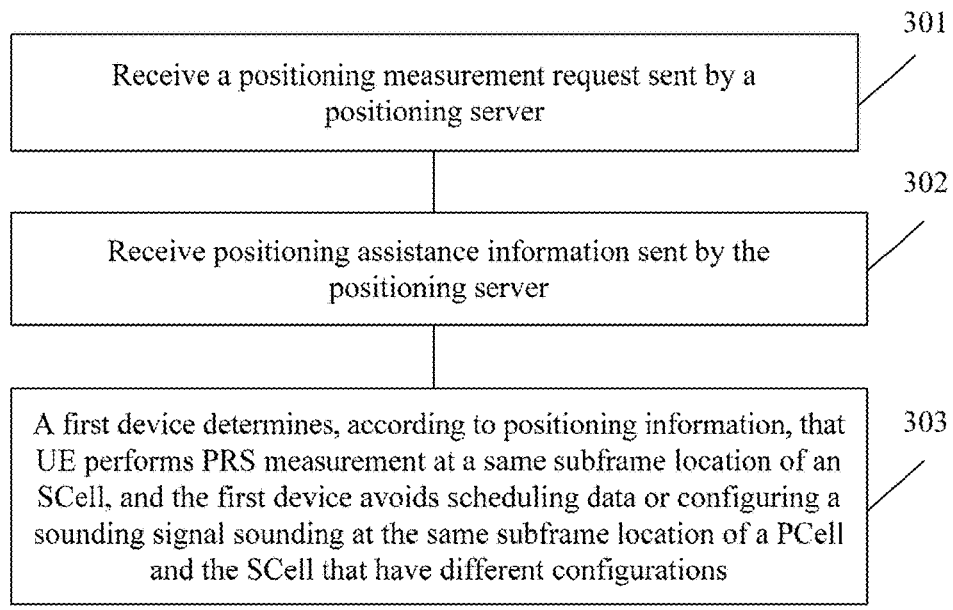
FIG. 3 shows a schematic flowchart of another positioning method for different TDD uplink-downlink configurations according to an embodiment of the present invention.

FIG. 3 shows a positioning method for different TDD uplink-downlink configurations according to an embodiment of the present invention. When a primary cell PCell and a secondary cell SCell that are of user equipment UE have different uplink-downlink configurations at a same subframe location, and the UE does not support simultaneous transmission and reception, the method includes:

301. The UE receives a positioning measurement request sent by a positioning server.

302. The UE receives positioning assistance information sent by the positioning server, where the positioning assistance information includes at least positioning reference signal PRS information.

303. The UE measures, according to the positioning assistance information, $N_{PRS}$ consecutive subframes including a PRS on an SCell, where the $N_{PRS}$ PRS subframes do not include a downlink subframe that is of the SCell and that is at the same subframe location as an uplink subframe or a special subframe of a PCell.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 3A:
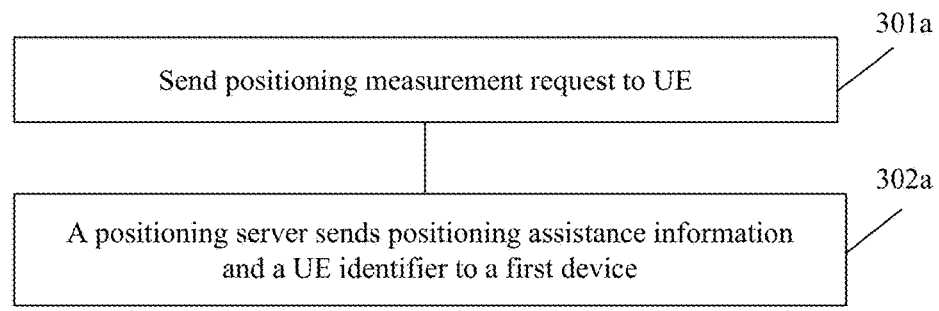
FIG. 3a shows a schematic flowchart of another positioning method for different TDD uplink-downlink configurations according to an embodiment of the present invention.

FIG. 3a shows a positioning method for different TDD uplink-downlink configurations according to an embodiment of the present invention. When a PCell and an SCell that are of user equipment UE have different uplink-downlink configurations at a same subframe location, and the UE does not support simultaneous transmission and reception, the method includes:

301a. A positioning server sends a positioning measurement request to the UE.

302a. The positioning server sends a positioning assistance information and a UE identifier to a first device, where the positioning assistance information includes at least positioning reference signal PRS information, or PRS information and a Cell ID, so that the first device determines, according to the positioning information, that the UE performs PRS measurement at the same subframe location of the SCell that has same configuration, and avoids scheduling data or configuring a sounding signal sounding at the same subframe location of the PCell and the SCell that have different configurations.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 4:
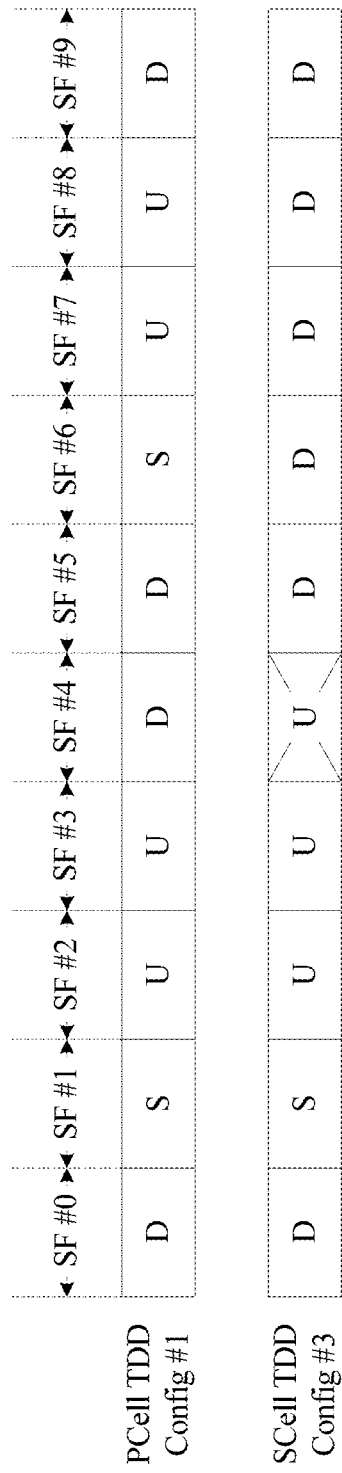
FIG. 4 shows a schematic diagram of a frame structure of different TDD uplink-downlink configurations according to an embodiment of the present invention.
Figure 6:
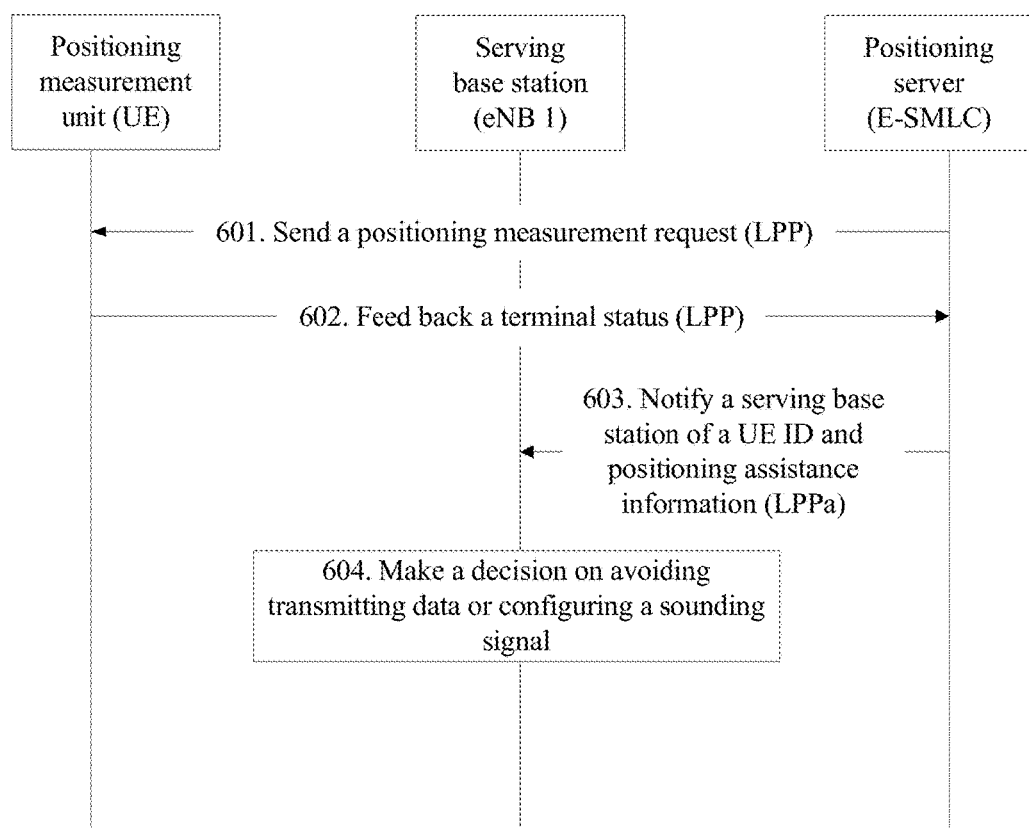
FIG. 6 shows a schematic flowchart of another positioning method for different TDD uplink-downlink configurations according to an embodiment of the present invention.

As shown in FIG. 4, in an embodiment, SFs #4 of a PCell and an SCell have different uplink-downlink configurations. When the SF #4 of the PCell is a downlink subframe or a special subframe, and the SF #4 is used to receive a downlink signal or channel, UE cannot send any signal or channel on the SF #4 of the SCell. On the contrary, as shown in FIG. 5, in an embodiment, when an SF #4 of a PCell is an uplink subframe or a special subframe, and the SF #4 is used to send an uplink signal or channel, UE cannot send any signal or channel on an SF #4 of an SCell. For a clearer understanding of this criterion, FIG. 6 shows another positioning method for different TDD uplink-downlink configurations according to an embodiment of the present invention. The method includes:

601. A positioning server sends a positioning measurement request to UE.

The positioning measurement request is directly sent by the positioning server to the UE; or the positioning measurement request may be included in "request location information" as an IE.

It should be specially noted that the positioning measurement request is used to request the UE to perform positioning (Boolean). An example of the positioning measurement request includes but is not limited to the foregoing description, provided that a message that can be used to request the UE to perform positioning falls within the protection scope of this embodiment of the present invention.

602. When the UE determines that subframes at a same subframe location of a PCell and an SCell that are of the UE have different TDD uplink-downlink configurations, and the UE does not support simultaneous transmission and reception, the UE sends a terminal status feedback message to the positioning server.

It should be specially noted that the terminal status feedback message may be used to notify the positioning server that the subframes at the same subframe location of the PCell and the SCell have different uplink-downlink configurations, and the UE does not support simultaneous transmission and reception.

Specifically, the status feedback message may include 1 bit.

603. After receiving the status feedback message, the positioning server learns that the PCell and the SCell that are of the UE have different TDD uplink-downlink configurations at the same subframe location, and the UE does not support simultaneous transmission and reception, the positioning server sends a UE identifier and positioning assistance information to a serving base station.

The UE identifier is used to notify the serving base station that the UE corresponding to the UE identifier is performing the positioning and is in different TDD uplink-downlink configurations.

The positioning assistance information is used for cell positioning, and the positioning assistance information includes at least positioning reference signal PRS information, or PRS information and a Cell ID; that is, the UE may determine a location of a PRS according to the PRS information, and the Cell ID is used to determine the cell that needs to be positioned.

Further, the PRS information may include at least one of a PRS bandwidth, timing information, period information, a quantity of subframes, or muting information.

It should be specially noted that when the positioning assistance information includes the PRS information of the cell, the PRS information of the cell may include a location at which a PRS opportunity occurs and an interval at which the PRS opportunity occurs (for example, Tprs=160 ms), and the PRS opportunity includes Nprs (1, 2, 4, or 6) consecutive PRS subframes. The UE receives the PRS according to the location at which the PRS opportunity occurs and the interval at which the PRS opportunity occurs.

Figure 7:
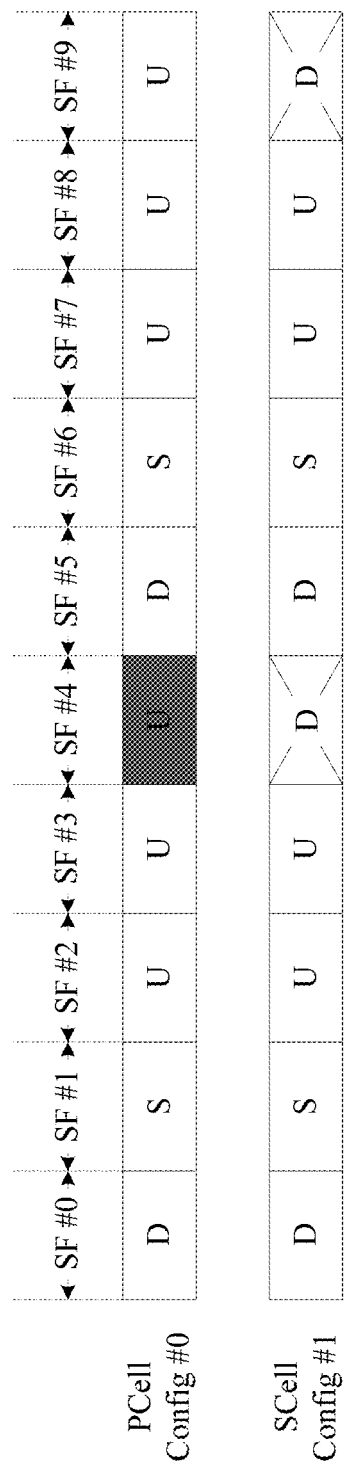
FIG. 7 shows another schematic diagram of a frame structure of different TDD uplink-downlink configurations according to an embodiment of the present invention.

604. After the serving base station receives the UE identifier and the positioning assistance information, the serving base station determines that the UE performs PRS measurement at the same subframe location of the SCell, and a first device avoids scheduling data or configuring a sounding signal sounding at the same subframe location of the PCell and the SCell that have different configurations. Details are as follows:

As shown in FIG. 7, if an SF #4 of an SCell is a PRS subframe, correspondingly, a subframe SF #4 of a PCell is configured to be an uplink subframe. Because different TDD uplink-downlink subframe configurations are used, UE does not support simultaneous transmission and reception, and the UE cannot receive PRS information on the SF #4 of the PCell. To improve measurement accuracy, uplink scheduling may not be performed on the SF #4 of the PCell by using a network, so that the UE can perform PRS measurement on the SF #4 of the SCell; or if an SF #4 of an SCell is configured to be a PRS subframe, a sounding signal may not be configured on an SF #4 of a PCell by using a network, so that UE can perform PRS measurement on the SF #4 of the SCell.

Figure 8:
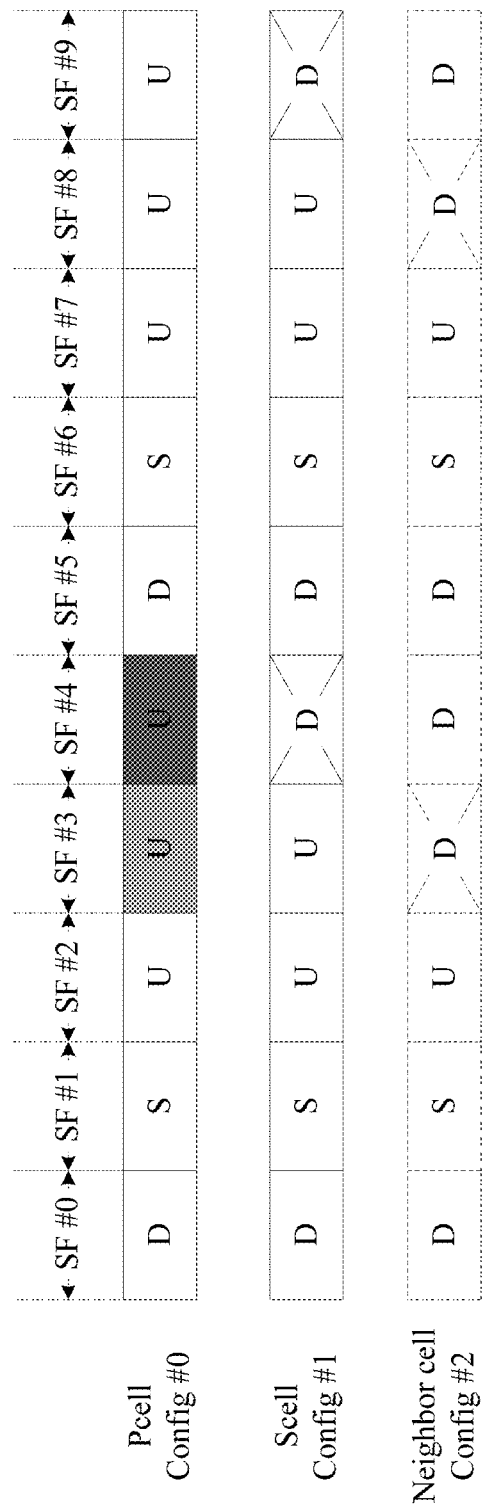
FIG. 8 shows another schematic diagram of a frame structure of different TDD uplink-downlink configurations according to an embodiment of the present invention.

It should be specially noted that, for both scheduling on the PCell and sending of the sounding signal on the PCell, a positioning configuration of a neighboring cell needs to be considered. As shown in FIG. 8, in a neighboring cell configuration 2, because an SF #3 is configured to be a PRS subframe, but the SF #3 of the PCell is an uplink subframe, the SF #3 in the neighboring cell configuration 2 and an SF #3 in a PCell configuration 0 have different uplink-downlink subframe configurations; that is, the UE cannot simultaneously transmit and receive data. To improve positioning accuracy, a base station may not perform the uplink scheduling on the SF #3 of the PCell; or a base station does not configure the sounding signal on the SF #3 of the PCell.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 9:
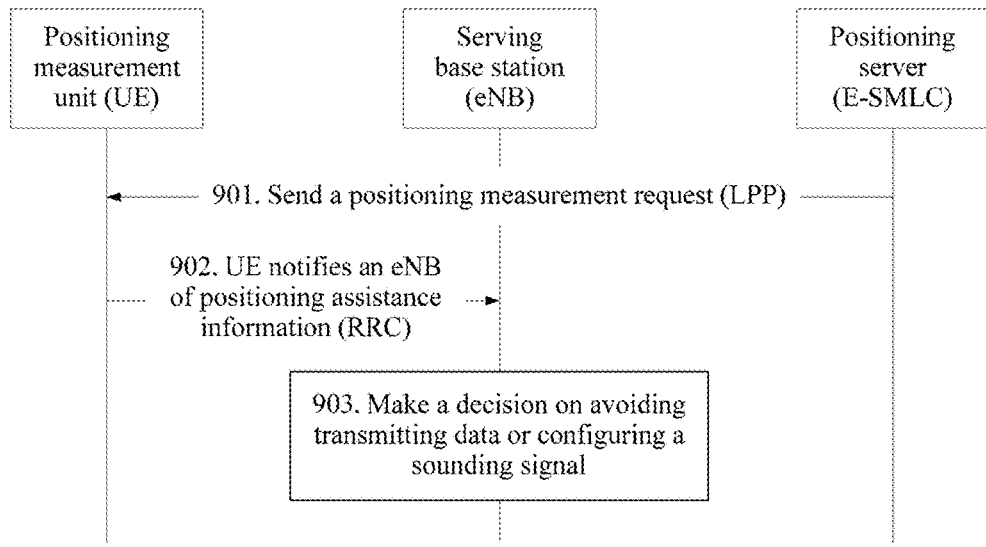
FIG. 9 shows a schematic flowchart of another positioning method for different TDD uplink-downlink configurations according to an embodiment of the present invention.

FIG. 9 shows a positioning method for different TDD uplink-downlink configurations according to an embodiment of the present invention. The method includes:

901. A positioning server sends a positioning measurement request to UE.

902. When the UE determines that subframes at a same subframe location of a PCell and an SCell that are of the UE have different uplink-downlink configurations, and the UE does not support simultaneous transmission and reception, the UE sends a UE identifier and positioning assistance information to an eNB.

The positioning assistance information is used for cell positioning, and the positioning assistance information includes at least a positioning reference signal (PRS) information, or a PRS information and a Cell ID; that is, the UE may determine a location of a PRS according to the PRS information, and the Cell ID is used to determine the cell that needs to be positioned.

Further, the positioning assistance information may include a CP length and/or an antenna configuration.

903. After the eNB receives the UE identifier and the positioning assistance information, a first device determines that the UE performs PRS measurement at the same subframe location of the SCell, and the first device avoids scheduling data or configuring a sounding signal sounding at the same subframe location of the PCell and the SCell that have different configurations. For a specific avoidance method, refer to step 604 of the embodiment shown in FIG. 6, and details are not described herein again.

A beneficial effect of this embodiment is similar to the beneficial effect of the embodiment shown in FIG. 6, and details are not described herein again.

Figure 10:
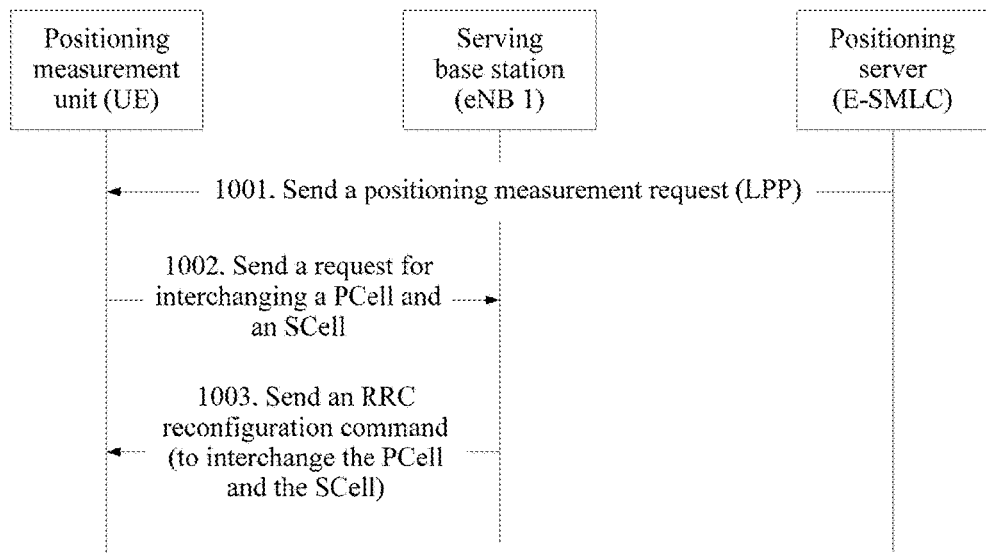
FIG. 10 shows a schematic flowchart of another positioning method for different TDD uplink-downlink configurations according to an embodiment of the present invention.

When a positioning server configures a Cell ID for UE, and instructs the UE to perform positioning, the positioning server does not learn whether a cell corresponding to the Cell ID is a PCell or an SCell. If the cell corresponding to this Cell ID is exactly the SCell of the UE, according to an existing protocol, downlink reception on the SCell is limited by a TDD uplink-downlink configuration of the PCell. To resolve this problem, FIG. 10 shows a positioning method for different TDD uplink-downlink configurations according to an embodiment of the present invention. The method includes:

1001. A positioning server sends a positioning measurement request to UE.

1002. When subframes at a same subframe location of a PCell and an SCell that are of the UE have different uplink-downlink configurations, and the UE does not support simultaneous transmission and reception, the UE sends, to an eNB, a request for interchanging the PCell and the SCell.

Specifically, the interchange request may include 1 bit and is used to instruct the eNB to interchange the PCell and the SCell. Certainly, this is only an example listed in this embodiment, and the present invention includes but is not limited to the foregoing example, provided that a message or a command that can be used to trigger the eNB to interchange the PCell and the SCell falls within the protection scope of the present invention.

1003. The eNB sends an RRC reconfiguration command to the UE, so as to interchange the SCell and the PCell.

It should be specially noted that, by means of interchanging the SCell and the PCell, a carrier used for positioning is used as a primary component carrier, and the UE receives a PRS on a configured downlink subframe without considering a limitation when the SCell is used for positioning.

Specifically, when configuring the Cell ID for the UE to enable the UE to perform positioning, the positioning server actually does not learn whether the cell is the PCell or the SCell of the UE. If the cell corresponding to the Cell ID is the SCell of the UE, according to the existing protocol, the downlink reception on the SCell is limited by the TDD uplink-downlink configuration of the PCell. Therefore, if the cells are interchanged, it is equivalent to the fact that the UE is positioned on the PCell and is no longer limited to a configuration on the SCell.

Therefore, when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 11:
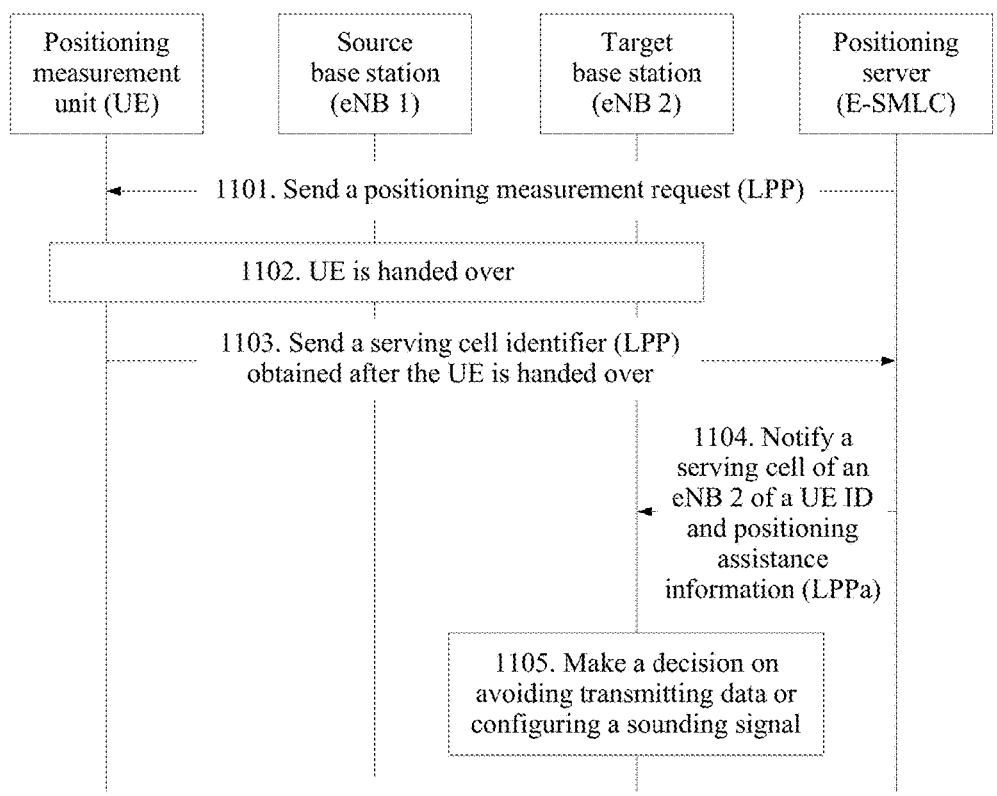
FIG. 11 shows a schematic flowchart of another positioning method for different TDD uplink-downlink configurations according to an embodiment of the present invention.

FIG. 11, FIG. 12, FIG. 13, and FIG. 14 each show another positioning method for different TDD uplink-downlink configurations. An application scenario of the methods is as follows: Subframes at a same subframe location of a PCell and an SCell have different TDD uplink-downlink configurations, and UE does not support simultaneous transmission reception and is handed over in a positioning process; a source eNB is an eNB 1 before a handover, and a target eNB is an eNB 2 after the handover. Details are as follows:

FIG. 11 shows a positioning method for different TDD uplink-downlink configurations according to an embodiment of the present invention. The method includes:

1101. A positioning server sends a positioning measurement request to UE.

1102. The UE is handed over in a positioning process.

1103. The UE sends, to the positioning server, a serving Cell ID entifier obtained after the UE is handed over, so as to notify the positioning server of a location after the UE is handed over.

The serving Cell ID entifier obtained after the UE is handed over may include a physical Cell ID entifier (PCI), a cell global identification (CGI), or an access point (AP) index number of a cell.

1104. The positioning server sends a UE identifier and positioning assistance information to a serving cell of an eNB 2.

The UE identifier is an identifier that is of the UE and that is sent by the UE to the positioning server.

1105. After the eNB 2 receives the UE identifier and the positioning assistance information, a first device determines that the UE performs PRS measurement at the same subframe location of an SCell, and the first device avoids scheduling data or configuring a sounding signal sounding at a same subframe location of a PCell and the SCell that have different configurations. A specific avoidance method is similar to the avoidance method in step 604 of the embodiment shown in FIG. 6, and details are not described herein again.

Figure 12:
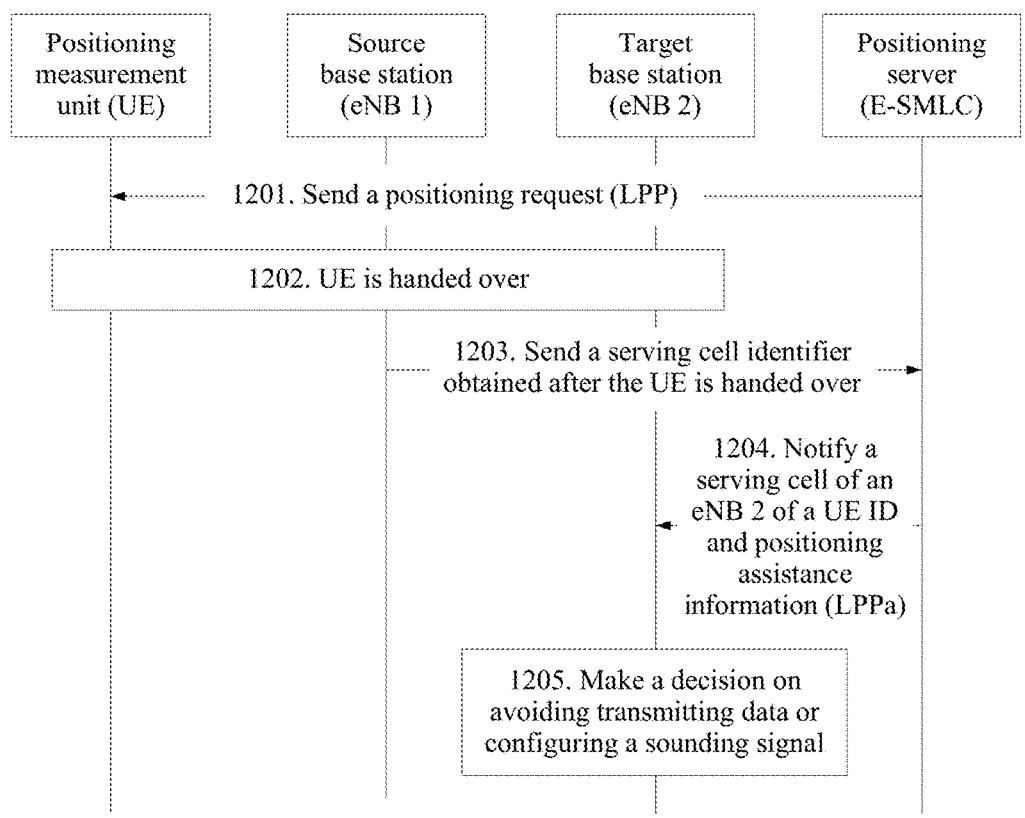
FIG. 12 shows a schematic flowchart of another positioning method for different TDD uplink-downlink configurations according to an embodiment of the present invention.

FIG. 12 shows a positioning method for different TDD uplink-downlink configurations according to an embodiment of the present invention. Steps 1201, 1202, 1204, and 1205 of the method are similar to steps 1101, 1102, 1104, and 1105 of the embodiment shown in FIG. 11, and a difference is as follows:

1203. An eNB 1 sends, to the positioning server, a serving Cell ID entifier obtained after the UE is handed over.

Figure 13:
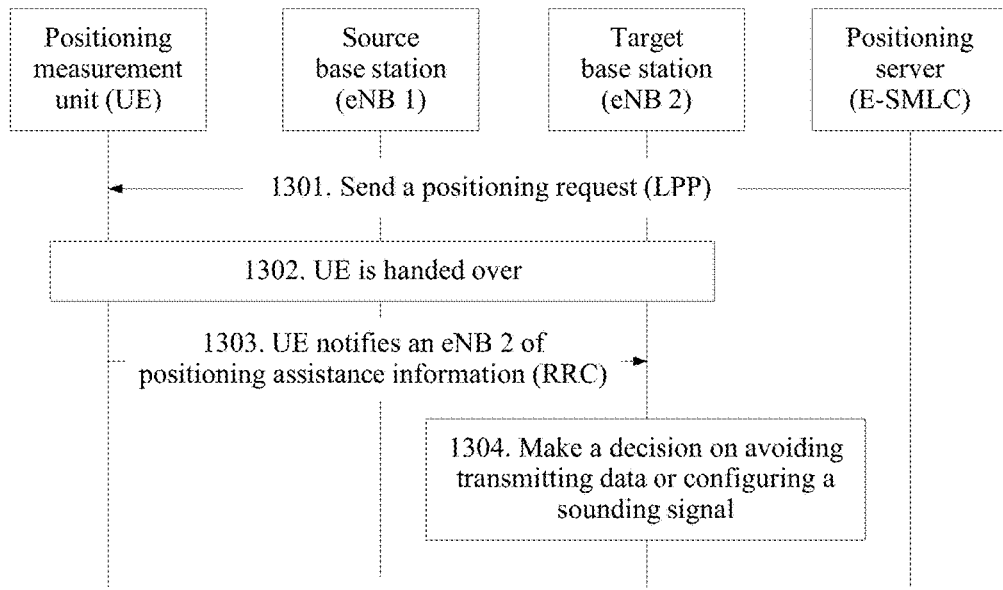
FIG. 13 shows a schematic flowchart of another positioning method for different TDD uplink-downlink configurations according to an embodiment of the present invention.

FIG. 13 shows a positioning method for different TDD uplink-downlink configurations according to an embodiment of the present invention. Steps 1301, 1302, 1304, and 1305 of the method are similar to steps 1101, 1102, 1104, and 1105 of the embodiment shown in FIG. 11, and a difference is as follows:

1303. The UE sends positioning assistance information to an eNB 2.

The positioning assistance information is used for cell positioning, and the positioning assistance information includes at least a positioning reference signal (PRS) information, or a PRS information and a Cell ID; that is, the UE may determine a location of a PRS according to the PRS information, and the Cell ID is used to determine the cell that needs to be positioned.

Further, the positioning assistance information may include a CP length and/or an antenna configuration.

Figure 14:
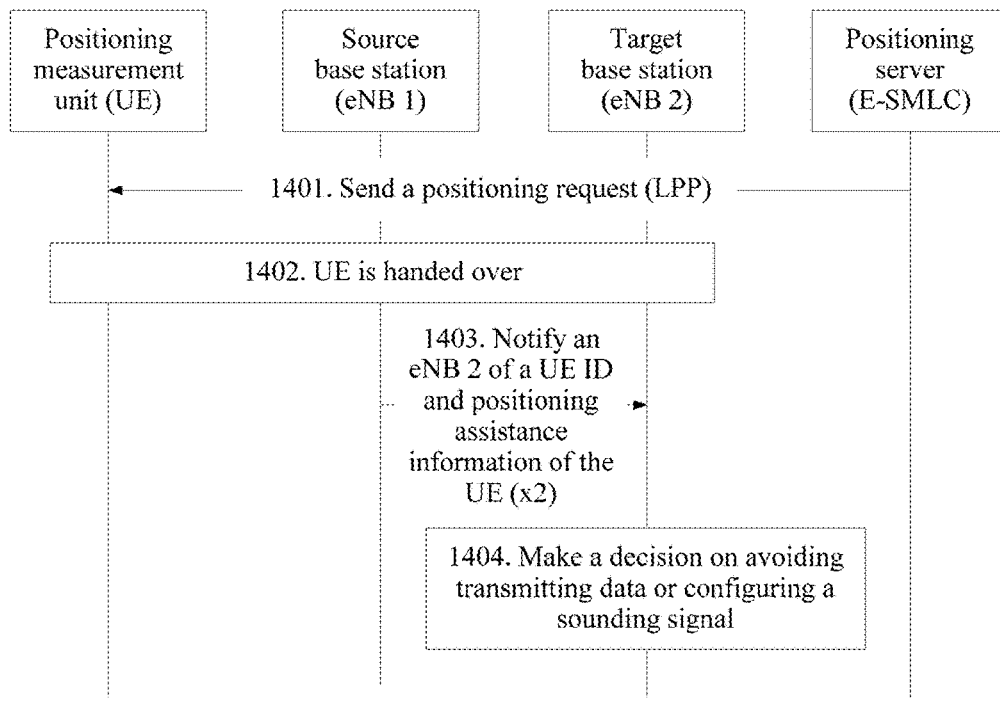
FIG. 14 shows a schematic flowchart of another positioning method for different TDD uplink-downlink configurations according to an embodiment of the present invention.

FIG. 14 shows a positioning method for different TDD uplink-downlink configurations according to an embodiment of the present invention. Steps 1401, 1402, 1404, and 1405 of the method are similar to steps 1101, 1102, 1104, and 1105 of the embodiment shown in FIG. 11, and a difference is as follows:

1403. An eNB 1 sends a UE identifier and positioning assistance information to an eNB 2, where the UE identifier is an ID that is of the UE and that is sent by a source base station to a target base station.

The UE identifier is used to notify a serving base station that the UE corresponding to the UE identifier is performing positioning and is in different TDD uplink-downlink configurations.

The positioning assistance information is used for cell positioning, and the positioning assistance information includes at least a positioning reference signal (PRS) information, or a PRS information and a Cell ID; that is, the UE may determine a location of a PRS according to the PRS information, and the Cell ID is used to determine the cell that needs to be positioned.

Further, the positioning assistance information may include a CP length and/or an antenna configuration.

Based on the foregoing embodiments shown in FIG. 11 to FIG. 14, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 15:
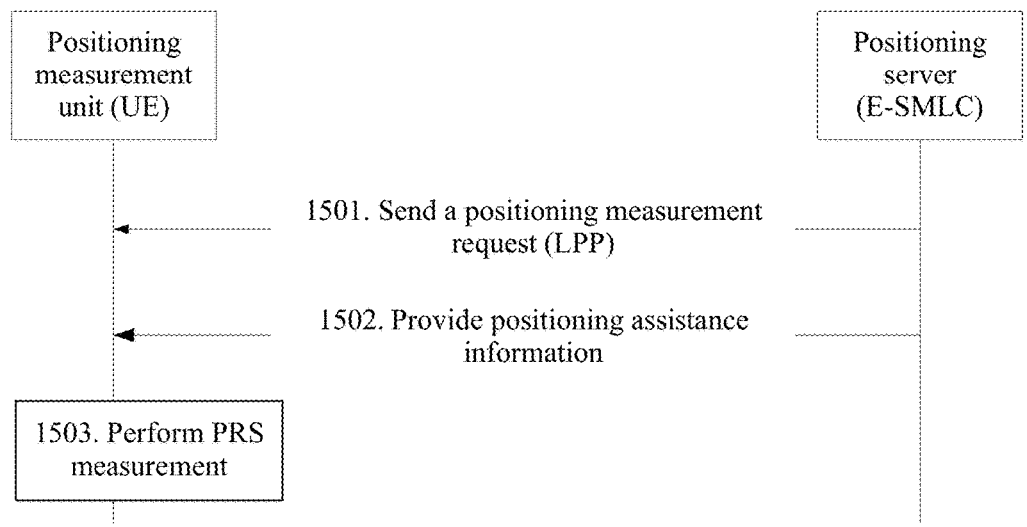
FIG. 15 is a schematic block diagram of a positioning method for different TDD uplink-downlink configurations according to an embodiment of the present invention.

FIG. 15 shows a positioning method for different TDD uplink-downlink configurations according to an embodiment of the present invention. It should be understood that, in this embodiment of the present invention, when two cells have different TDD uplink-downlink configurations in an aggregation scenario, and UE does not support simultaneous transmission and reception, if a current subframe corresponding to a PCell is an uplink subframe or a special subframe, a PRS cannot be sent on a subframe that is at a same location of an SCell and that is corresponding to the uplink subframe or the special subframe; or when multiple cells have different TDD uplink-downlink configurations in an aggregation scenario, and UE does not support simultaneous transmission and reception, if a subframe that is at a same location of a PCell and that is corresponding to any subframe of an SCell is an uplink subframe or a special subframe, a PRS cannot be sent on the subframe of the SCell. To resolve this problem, this embodiment of the present invention provides the following method, including:

1501. A positioning server sends a positioning measurement request to UE.

1502. The positioning server provides positioning assistance information for the UE.

The positioning assistance information includes at least a positioning reference signal (PRS) information, or a PRS information and a Cell ID; that is, the UE may determine a location of a PRS according to the PRS information, and the Cell ID is used to determine a cell that needs to be positioned.

It should be specially noted that when the positioning assistance information includes the PRS information of the cell, the PRS information of the cell may include a location at which a PRS opportunity occurs and an interval at which the PRS opportunity occurs (for example, Tprs=160 ms), and the PRS opportunity includes Nprs (1, 2, 4, or 6) consecutive PRS signals. The UE receives the PRS according to the location at which the PRS opportunity occurs and the interval at which the PRS opportunity occurs.

1503. The UE performs, according to the positioning assistance information, PRS-based measurement on an SCell, and measures $N_{PRS}$ consecutive subframes including a PRS on the SCell.

It should be specially emphasized that the $N_{PRS}$ PRS subframes do not include a downlink subframe that is of the SCell and that is at the same subframe location as the uplink subframe or the special subframe of the PCell.

Optionally, a network side device or a core network device may send the PRS subframe only on an SF#0 of the SCell and an SF#5 of the SCell; or a network side device or a core network device performs the PRS-based measurement only on the special subframe of the SCell.

Specifically, regardless of TDD uplink-downlink configurations of the PCell, both an SF#0 of the PCell and an SF#5 of the PCell are downlink subframes. If it is set that the SCell can configure the PRS on only the SF#0 and the SF#5, the UE may perform the measurement by using the PRS configured by the SCell.

Optionally, when the PCell and the SCell have different uplink-downlink configurations at the same subframe location, and the UE does not support simultaneous transmission and reception, if the PRS needs to be received on a specific subframe or some subframes of the SCell, the UE does not perform uplink sending at a same subframe location of the PCell or another SCell.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 16:
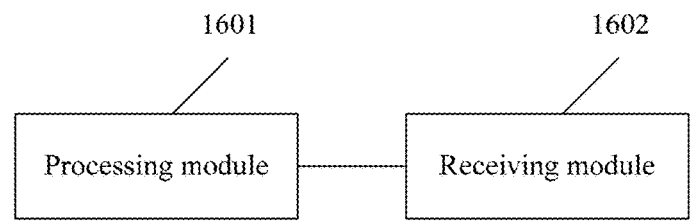
FIG. 16 is a schematic block diagram of a positioning apparatus for different TDD uplink-downlink configurations according to an embodiment of the present invention.

FIG. 16 is a schematic block diagram of a positioning apparatus for different TDD uplink-downlink configurations according to an embodiment of the present invention. It should be specially noted that the apparatus shown in FIG. 16 may be used to perform the methods shown in FIG. 6, FIG. 9, FIG. 11, FIG. 12, FIG. 13, and FIG. 14. The apparatus includes:

a processing module 1601, configured to determine that a primary cell PCell and a secondary cell SCell that are of user equipment UE have different uplink-downlink configurations at a same subframe location, and the UE does not support simultaneous transmission and reception; and a receiving module 1602, configured to receive positioning information of the UE according to a result determined by the processing module 1601, where the positioning information includes positioning assistance information, or positioning assistance information and a UE identifier, and the positioning assistance information includes at least positioning reference signal PRS information, or PRS information and a Cell ID; where the processing module 1601 is configured to: determine, according to the positioning information received by the receiving module, that the UE performs PRS measurement at the same subframe location of the SCell that has same configuration, and avoid scheduling data or configuring a sounding signal sounding at the same subframe location of the PCell and the SCell that have different configurations, so that the UE performs the PRS measurement.

When the apparatus is a serving base station, the receiving module is specifically configured to:

receive the positioning assistance information sent by the UE; or receive the positioning assistance information and the UE identifier that are sent by a positioning server.

When the apparatus is a target base station, the receiving module is specifically configured to:

after the UE hands over from a source base station to the target base station, receive the positioning assistance information sent by the UE; or after the UE hands over from a source base station to the target base station, receive the UE identifier and the positioning assistance information of the UE that are sent by the positioning server, where the UE identifier is sent by the UE to the positioning server; or after the UE hands over from a source base station to the target base station, receive the UE identifier and the positioning assistance information of the UE that are sent by the positioning server, where the UE identifier is sent by the source base station to the positioning server; or after the UE hands over from a source base station to the target base station, receive the UE identifier and the positioning assistance information of the UE that are sent by the source base station, where the UE identifier is sent by the source base station to the target base station.

The processing module is specifically configured to: If a subframe at the same subframe location of the PCell is a downlink subframe, skip scheduling the downlink subframe, so that the UE sends a signal and a channel on a subframe that is of the SCell and that is at the same subframe location of the PCell; or if a subframe at the same subframe location of the PCell is an uplink subframe, skip scheduling the uplink subframe or configuring a sounding signal, so that the UE receives downlink transmission on a subframe that is of the SCell and that is at the same subframe location of the PCell; or if a subframe at the same subframe location of the PCell is a special subframe, skip scheduling the special subframe, so that the UE receives a downlink signal in an OFDM symbol that is of the SCell and that overlaps a guard period or an UpPTS in the special subframe of the PCell.

It should be specially noted that, in this embodiment of the present invention, the receiving module may be a receiver, and the processing module may be a processor.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 17:
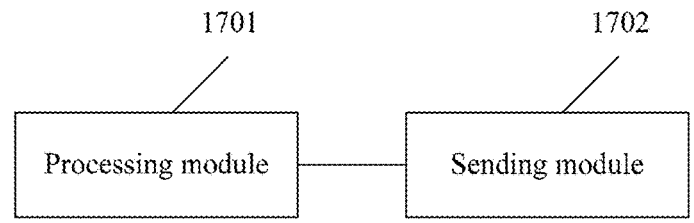
FIG. 17 is a schematic block diagram of a positioning apparatus for different TDD uplink-downlink configurations according to an embodiment of the present invention.

FIG. 17 is a schematic block diagram of a positioning apparatus for different TDD uplink-downlink configurations according to an embodiment of the present invention. It should be specially noted that the apparatus shown in FIG. 17 may be configured to perform the foregoing method embodiment shown in FIG. 15. The apparatus includes:

a processing module 1701, configured to determine that a primary cell PCell and a secondary cell SCell that are of user equipment UE have different uplink-downlink configurations at a same subframe location, and the UE does not support simultaneous transmission and reception; and a receiving module 1702, configured to receive, according to a result determined by the processing module 1701, a positioning measurement request sent by a positioning server; where the receiving module 1702 is configured to receive positioning assistance information sent by the positioning server, where the positioning assistance information includes at least positioning reference signal PRS information; and the processing module 1701 is configured to measure, according to the positioning assistance information received by the receiving module 1702, $N_{PRS}$ consecutive subframes including a PRS on the SCell, where the $N_{PRS}$ PRS subframes do not include a downlink subframe that is of the SCell and that is at the same subframe location as an uplink subframe or a special subframe of the PCell.

It should be specially noted that, in this embodiment of the present invention, a receiving module may be a receiver, and the processing module may be a processor.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 18:
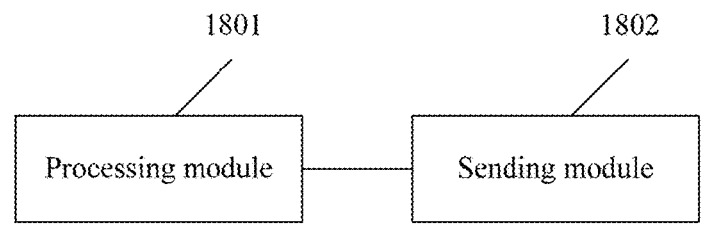
FIG. 18 is a schematic block diagram of a positioning apparatus for different TDD uplink-downlink configurations according to an embodiment of the present invention.

FIG. 18 is a schematic block diagram of a positioning apparatus for different TDD uplink-downlink configurations according to an embodiment of the present invention. It should be specially noted that the apparatus shown in FIG. 18 may be configured to perform the foregoing method embodiment shown in FIG. 15. The apparatus includes:

a processing module 1801, configured to determine that a primary cell PCell and a secondary cell SCell that are of user equipment UE have different uplink-downlink configurations at a same subframe location, and the UE does not support simultaneous transmission and reception; and a receiving module 1802, configured to receive, according to a result determined by the processing module 1801, a positioning measurement request sent by a positioning server; where the receiving module 1802 is configured to receive positioning assistance information sent by the positioning server, where the positioning assistance information includes at least positioning reference signal PRS information; and the processing module 1801 is configured to measure, according to the positioning assistance information received by the receiving module 1802, $N_{PRS}$ consecutive subframes including a PRS on the SCell, where the $N_{PRS}$ PRS subframes do not include a downlink subframe that is of the SCell and that is at the same subframe location as an uplink subframe or a special subframe of the PCell.

It should be specially noted that, in this embodiment of the present invention, a receive module may be a receiver, and the processing module may be a processor.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 19:
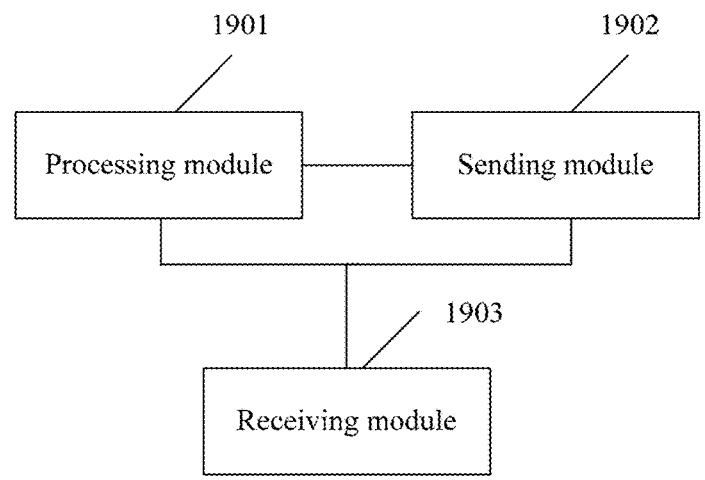
FIG. 19 is a schematic block diagram of a positioning apparatus for different TDD uplink-downlink configurations according to an embodiment of the present invention.

FIG. 19 is a schematic block diagram of a positioning apparatus for different TDD uplink-downlink configurations according to an embodiment of the present invention. It should be specially noted that the apparatus shown in FIG. 19 may be configured to perform the methods shown in FIG. 6, FIG. 11, and FIG. 12. The apparatus includes:

a processing module 1901, configured to determine that a primary cell PCell and a secondary cell SCell that are of user equipment UE have different uplink-downlink configurations at a same subframe location, and the UE does not support simultaneous transmission and reception; and a sending module 1902, configured to send a positioning measurement request to the user equipment UE according to a result determined by the processing module 1901; where the sending module 1902 is configured to send the positioning information including positioning assistance information and the UE identifier to a first device, where the positioning assistance information includes at least positioning reference signal PRS information, or PRS information and a Cell ID, so that the first device determines, according to the positioning information, that the UE performs PRS measurement at the same subframe location of the SCell that has same configuration, and avoids scheduling data or configuring a sounding signal sounding at the same subframe location of the PCell and the SCell that have different configurations.

The processing module 1901 is further configured to: if a subframe at the same subframe location of the PCell is an uplink subframe, and the UE does not send any data on the uplink subframe, receive a downlink signal on a subframe that is of the SCell and that is at the same subframe location of the PCell; or if a subframe at the same subframe location of the PCell is an uplink subframe, and the UE needs to measure a PRS signal on a subframe that is of the SCell and that is at the same subframe location of the PCell, skip sending any data on the uplink subframe.

It should be specially noted that, in this embodiment of the present invention, the receiving module 1903 may be a receiver, the sending module may be a transmitter, and the processing module may be a processor.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

Figure 20:
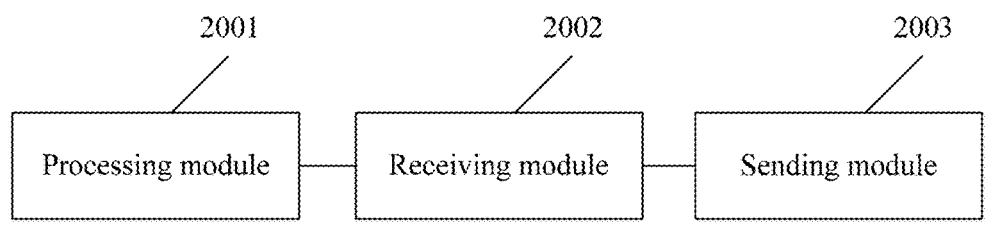
FIG. 20 is a schematic block diagram of a positioning apparatus for different TDD uplink-downlink configurations according to an embodiment of the present invention.

FIG. 20 is a schematic block diagram of a positioning apparatus for different TDD uplink-downlink configurations according to an embodiment of the present invention. The apparatus shown in FIG. 20 may be configured to perform the method shown in FIG. 13. The apparatus includes:

a processing module 2001, configured to determine that a primary cell PCell and a secondary cell SCell that are of user equipment UE have different uplink-downlink configurations at a same subframe location, and the UE does not support simultaneous transmission and reception;

a receiving module 2002, configured to receive a positioning measurement request according to a result determined by the processing module 2001; where the processing module 2001, configured to hand over from a source base station to a target base station; and the sending module 2003 is configured to send positioning assistance information of the target base station to the target base station, where the positioning assistance information includes at least positioning reference signal PRS information, or PRS information and a Cell ID, so that the target base station determines, according to the positioning information, that the UE performs PRS measurement at the same subframe location of the SCell that has same configuration, and avoids scheduling data or configuring a sounding signal sounding at the same subframe location of the PCell and the SCell that have different configurations.

The processing module 2001 is further configured to: if a subframe at the same subframe location of the PCell is an uplink subframe, and the UE does not send any data on the uplink subframe, receive a downlink signal on a subframe that is of the SCell and that is at the same subframe location of the PCell; or if a subframe at the same subframe location of the PCell is an uplink subframe, and the UE needs to measure a PRS signal on a subframe that is of the SCell and that is at the same subframe location of the PCell, skip sending any data on the uplink subframe.

It should be specially noted that, in this embodiment of the present invention, the receiving module may be a receiver, the sending module may be a transmitter, and the processing module may be a processor.

In this embodiment, it is ensured that the UE achieves high measurement accuracy by specifying that $N_{PRS}$ PRS subframes do not include a downlink subframe colliding with the PCell.

It should be specially noted that a positioning server only sends the Cell ID to the UE, but the positioning server does not learn whether a cell corresponding to this Cell ID is the SCell or the PCell of the UE.

Based on the foregoing technical solution, according to the positioning method and apparatus for different TDD uplink-downlink configurations in this embodiment of the present invention, when a primary cell PCell and a serving cell SCell that are of user equipment UE have different uplink-downlink configurations at a same subframe location, and the UE does not support simultaneous transmission and reception, a first device determines that the UE performs PRS measurement at the same subframe location of the SCell, and the first device avoids scheduling data or configuring a sounding signal sounding at the same subframe location of the PCell and the SCell that have different configurations, so as to avoid a problem, in the prior art, that accuracy of OTDOA measurement is affected because the UE cannot receive a PRS signal at the same subframe location of the SCell, so that when the PCell and the SCell have different uplink-downlink configurations at the same subframe location, the UE that does not support simultaneous transmission and reception can perform positioning measurement by using a PRS subframe of the SCell, thereby improving positioning accuracy.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A positioning method for different Time Division Duplex (TDD), uplink-downlink configurations, wherein when a primary cell (PCell) and a serving cell (SCell) for a user equipment (UE) have different uplink-downlink configurations at a same subframe location, and the UE does not support simultaneous transmission and reception, the method comprises:
   receiving, by a first device, positioning information of the UE, wherein the positioning information comprises positioning assistance information, or positioning assistance information and a UE identifier, and the positioning assistance information comprises at least positioning reference signal (PRS) information, or PRS information and a Cell ID: and
   determining, by the first device and according to the positioning information, that the UE performs a PRS measurement at the same subframe location of the SCell, and configuring a sounding signal sounding at the same subframe location of the PCell and the SCell,
   wherein the configuring the sounding signal sounding at the same subframe location of the PCell and the SCell comprises;
   if a subframe at the same subframe location of the PCell is a downlink subframe, skipping by the first device, scheduling the downlink subframe; or
   if a subframe at the same subframe location of the PCell is an uplink subframe, skipping, by the first device, scheduling the uplink subframe or configuring a sounding signal; or
   if a subframe at the same subframe location of the PCell is a special subframe; skipping, by the first device, scheduling the special subframe.

2. The method according to claim 1, wherein when the first device is a serving base station, the receiving positioning information comprises,
   receiving the positioning assistance information sent by the UE; or
   receiving the positioning assistance information and the UE identifier that are sent by a positioning server.

3. The method according to claim 1 wherein when the first device is a target base station, the receiving positioning information of the UE comprises:
   after the UE hands over from a source base station to the target base station, receiving the positioning assistance information sent by the UE; or
   after the UE hands over front a source base station to the target base station, receiving the UE identifier and the positioning assistance information of the UE that are sent by a positioning server, wherein the UE identifier is sent by the UE to the positioning server; or
   after the UE hands over from a source base station to the target base station, receiving the UE identifier and the positioning assistance information of the UE, that are sent by a positioning server, wherein the UE identifier is sent by the source base station to the positioning server; or
   after the UE hands over from a source base station to the target base station, receiving the UE identifier and the positioning assistance information of the UE that are sent by the source base station, wherein the UE identifier is sent by the source base station to the target base station.

4. A positioning method for different Time Division Duplex (TDD) uplink-downlink configurations, wherein when a PCell and an SCell for a user equipment (UE) have different uplink-downlink configurations at a same subframe location, and the UE does not support simultaneous transmission and reception, the method comprises:
   receiving, by a positioning server, a positioning measurement request sent by the UE;
   sending, by the positioning server, positioning assistance information and a UE identifier to a first device, wherein the positioning assistance information comprises at least positioning reference signal (PRS) information, or PRS information and a Cell ID for determining, according to the positioning assistance information, that the UE performs a PRS measurement at the same subframe location of the SCell, and configuring a sounding signal sounding at the same subframe location of the PCell and the SCell,
   wherein the method further comprises;
   after the UE hands over from a source base station to a target base station, receiving, by the positioning server, a serving Cell ID identifier that is sent by the UE and that is obtained after the UE is handed over; or
   after the UE hands over from a source base station to a target base station, receiving, by the positioning server, a serving Cell ID identifier that is sent by the source base station and that is obtained after the UE is handed over.

5. The method according to claim 4, wherein the method further comprises:
   receiving, by the positioning server, UE status feedback information sent by the UE.

6. A positioning method for different Time Division Duplex (TDD) uplink-downlink configurations, wherein when a PCell and an SCell for a user equipment UE have different uplink-downlink configurations at a same subframe location, and the UE does not support simultaneous transmission and reception, the method comprises:
receiving, by the UE, a positioning measurement request;
handing over, by the UE, from a source base station to a target base station; and
sending, by the UE, positioning assistance information of the UE to the target base station, wherein the positioning assistance information comprises at least positioning reference signal (PRS) information, or PRS information and a Cell ID, determining, according to the positioning assistance information, that the UE performs a PRS measurement at the same subframe location of the SCell, and configuring a sounding signal sounding at the same subframe location of the PCell and the SCell,
wherein the method further comprises;
if a subframe at the same subframe location of the PCell is an uplink subframe, and the UE does not send any data on the uplink subframe, receiving, by the UE, a downlink signal on a subframe that is of the SCell and that is at the same subframe location of the PCell; or
if a subframe at the same subframe location of the PCell is an uplink subframe, and the UE needs to measure a PRS on a subframe that is of the SCell and that is at the same subframe location of the PCell, skipping, by the UE, sending any data on the uplink subframe.

7. A positioning apparatus for different Time Division Duplex (TDD) uplink-downlink configurations, comprising:
a processor, configured to determine that a primary cell (PCell) and a secondary cell (SCell) that are of user equipment (UE) have different uplink-downlink configurations at a same subframe location, and the UE does not support simultaneous transmission and reception; and
a receiver, configured to receive positioning information of the UE according to a result determined by the processor, wherein the positioning information comprises positioning assistance information, or positioning assistance information and a UE identifier, and the positioning assistance information comprises at least positioning reference signal (PRS) information, or PRS information and a Cell ID;
wherein the processor is further configured to determine, according to the positioning assistance information received by the receiver, that the UE performs a PRS measurement at the same subframe location of the SCell, and configure a sounding signal sounding at the same subframe location of the PCell and the SCell,
wherein the processor is further configured to:
if a subframe at the same subframe location of the PCell is a downlink subframe, skip scheduling the downlink subframe; or
if a subframe at the same subframe location if the PCell is an uplink subframe, skip scheduling the uplink subframe or configuring a sounding signal; or
if a subframe at the same subframe location of the PCell is a special subframe, skip scheduling the special subframe.

8. The apparatus according to claim 7, wherein when the apparatus is a serving base station, the receiver is specifically configured to:
receive the positioning assistance is sent by the UE; or
receive the positioning assistance information and the UE identifier that are sent by a positioning server.

9. The apparatus according to claim 7, wherein when the apparatus is a target base station, the receiver is specifically configured to:

after the UE hands over from a source base station to the target base station, receive the positioning assistance information sent by the UE; or
after the UE hands over from a source base station to the target base station, receive the UE identifier and the positioning assistance information of the UE that are sent by a positioning server, wherein the UE identifier is sent by the UE to the positioning server; or
after the UE hands over from a source base station to the target base station, receive the UE identifier and the positioning assistance information of the UE that are sent by a positioning server, wherein the UE identifier is sent by the source base station to the positioning server; or
after the UE hands over from a source base station to the target base station, receive the UE identifier and the positioning assistance information of the UE that are sent by the source base station, wherein the UE identifier is sent by the source base station to the target base station.

10. A positioning apparatus for different Time Division Duplex (TDD) uplink-downlink configurations, comprising:
a processor, configured to determine that a primary cell (PCell) and a secondary cell (SCell) for a user equipment (UE) have different uplink-downlink configurations at a same subframe location, and the UE does not support simultaneous transmission and reception; and
a transmitter, configured to send a positioning measurement request to the UE according to a result determined by the processor; wherein:
the transmitter is configured to send positioning information comprising positioning assistance information and a UE identifier to a first device, wherein the positioning assistance information comprises at least positioning reference signal (PRS) information, or PRS information and a Cell ID, for determining, according to the positioning information, that the UE performs a PRS measurement at the same subframe location of the SCell, and avoids scheduling data or configuring a sounding signal sounding at the same subframe location of the PCell and the SCell,
wherein the apparatus further comprises:
a receiver, configured to:
after the UE hands over from a source base station to a target base station, receive a serving Cell ID identifier that is sent by the UE and that is obtained after the UE is handed over; or
after the UE hands over from a source base station to a target base station, receiving a serving Cell ID identifier that is sent by the source base station and that is obtained after the UE is handed over.

11. The apparatus according to claim 10, wherein the receiver is further configured to receive UE status feedback information sent by the UE.

12. A positioning apparatus for different Time Division Duplex (TDD) uplink-downlink configurations, comprising:
a processor, configured to:
determine that a primary cell (PCell) and a secondary cell (SCell) for a user equipment (UE) have different uplink-downlink configurations at a same subframe location, and the UE does not support simultaneous transmission and reception; and
hand over from a source base station to a target base station;
a receiver, configured to receive a positioning measurement request according to a result determined by the processor; and a transmitter, configured to send positioning assistance information of the target base station to the target base station, wherein the positioning assistance information comprises at least positioning reference signal (PRS) information, or PRS information and a Cell ID, for determining, according to the positioning information, that the UE performs a PRS measurement at the same subframe location of the SCell, and configuring a sounding signal sounding at the same subframe location of the PCell and the SCell, wherein the processor is further configured to:
if a subframe at the same subframe location if the PCell is an uplink subframe, and the UE does not send and data on the uplink subframe, receive a downlink signal on a subframe that is of the SCell and that is at the same subframe location of the PCell; or
if a subframe at the same subframe location of the PCell is an uplink subframe, and the UE needs to measure a PRS on a subframe that is of the SCell and that is at the same subframe location of the PCell, skip sending any data on the uplink subframe.

* * * * *

UNITED STATES PATENT AND TRADEMARK OFFICE
CERTIFICATE OF CORRECTION

PATENT NO.        : 10,531,347 B2
APPLICATION NO.   : 15/614301
DATED             : January 7, 2020
INVENTOR(S)       : Han et al.

Page 1 of 1

It is certified that error appears in the above-identified patent and that said Letters Patent is hereby corrected as shown below:

In the Claims

Claim 3, Column 24, Line 14: "UE hands over front a source" should read -- UE hands over from a source --.
Claim 7, Column 25, Line 53: "subframe location if the PCell" should read -- subframe location of the PCell --.
Claim 12, Column 27, Line 12: "location if the PCell" should read -- location of the PCell --.
Claim 12, Column 27, Line 13: "does not send and" should read -- does not send any --.

Signed and Sealed this
Fourth Day of May, 2021

Drew Hirshfeld
*Performing the Functions and Duties of the
Under Secretary of Commerce for Intellectual Property and
Director of the United States Patent and Trademark Office*